United States Patent [19]

Jensen

[11] Patent Number: 5,007,032
[45] Date of Patent: Apr. 9, 1991

[54] ACOUSTIC ALERT SENSOR

[75] Inventor: Randy M. Jensen, Inver Grove Heights, Minn.

[73] Assignee: Honeywell Inc., Minneapolis, Minn.

[21] Appl. No.: 535,267

[22] Filed: Jun. 8, 1990

[51] Int. Cl.⁵ .............................................. H04B 1/06
[52] U.S. Cl. .................................................. 367/136
[58] Field of Search ................................. 367/95–97, 367/135, 136; 102/427; 340/565, 566

[56] References Cited

U.S. PATENT DOCUMENTS

| | | | |
|---|---|---|---|
| 3,922,663 | 11/1975 | Lubke et al. | 367/136 |
| 3,984,804 | 10/1976 | Herring et al. | 367/188 |
| 3,995,223 | 11/1976 | Gimber et al. | 367/93 |
| 4,081,785 | 3/1978 | Ravis et al. | 367/135 |
| 4,415,979 | 11/1983 | Hernandez | 367/136 |
| 4,453,223 | 6/1984 | Ravel | 367/135 |
| 4,468,763 | 8/1984 | Braunling et al. | 367/136 |
| 4,520,503 | 5/1985 | Kirst et al. | 381/56 |
| 4,530,076 | 7/1985 | Dwyer | 367/135 |
| 4,542,525 | 9/1985 | Hopf | 381/56 |
| 4,604,738 | 8/1986 | Aggarwal et al. | 367/135 |
| 4,653,035 | 3/1987 | Braunling | 367/136 |
| 4,661,939 | 4/1987 | Braunling | 367/136 |
| 4,750,584 | 6/1988 | Tanaka et al. | 367/99 |

Primary Examiner—Thomas H. Tarcza
Assistant Examiner—Daniel T. Pihulic
Attorney, Agent, or Firm—John G. Shudy, Jr.

[57] ABSTRACT

An acoustic detector for detecting acoustic signals produced by vehicles. The detector comprises an acoustic sensor which senses an acoustic signal which is provided to a zero crossing detector. The zero crossing detector provides a digital signal representing the frequency of the incoming acoustic signal. The zero crossing detector's providing this digital signal to a first counter, the first counter's counting each zero crossing, and the first counter's reaching a predetermined count of zero crossings in a predetermined time for a predetermined number of times results in an acoustic alert provided to a secondary device which is put on alert of a vehicle in its vicinity. This secondary device may be a mine.

11 Claims, 6 Drawing Sheets

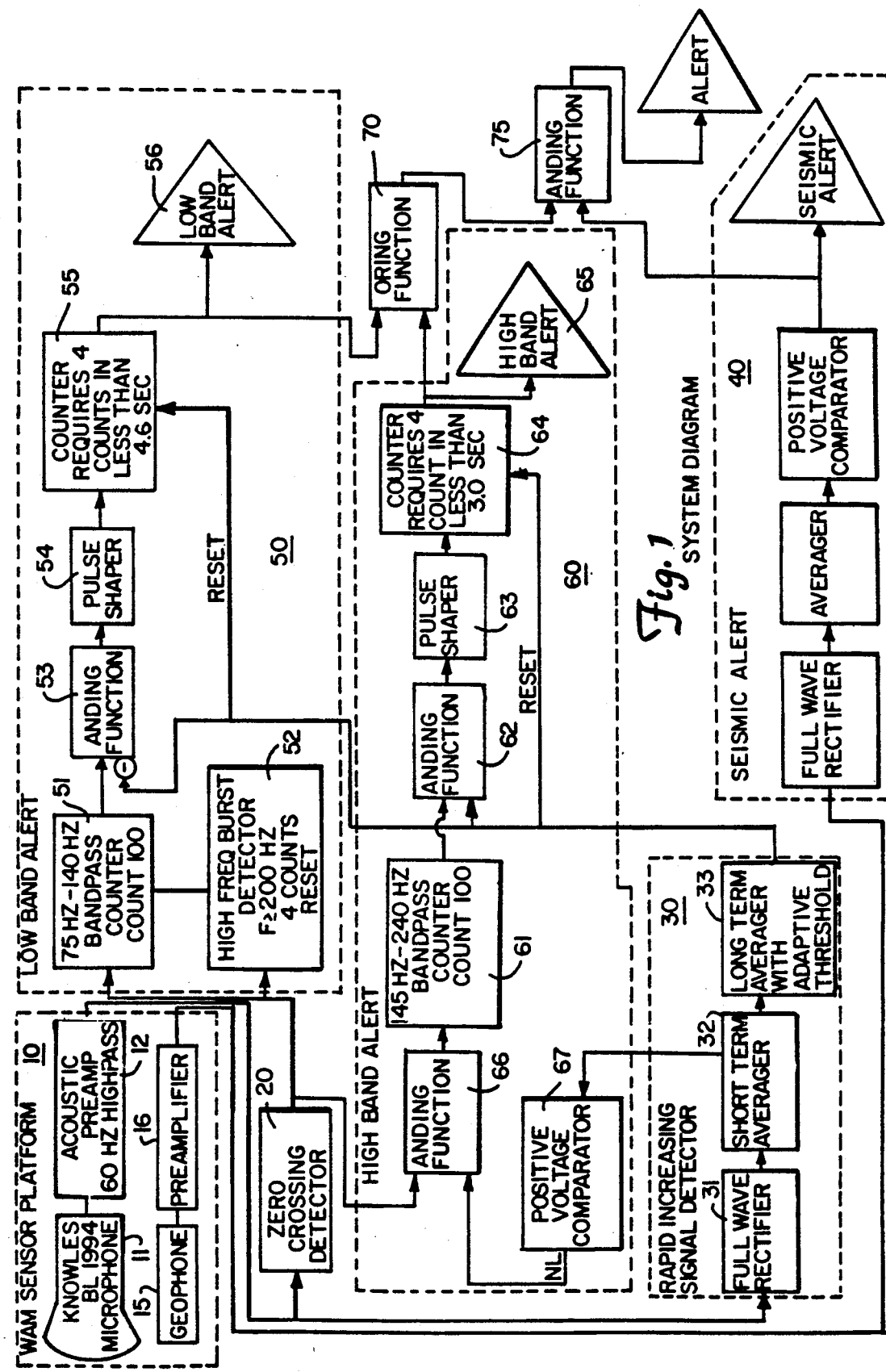
Fig. 1 SYSTEM DIAGRAM

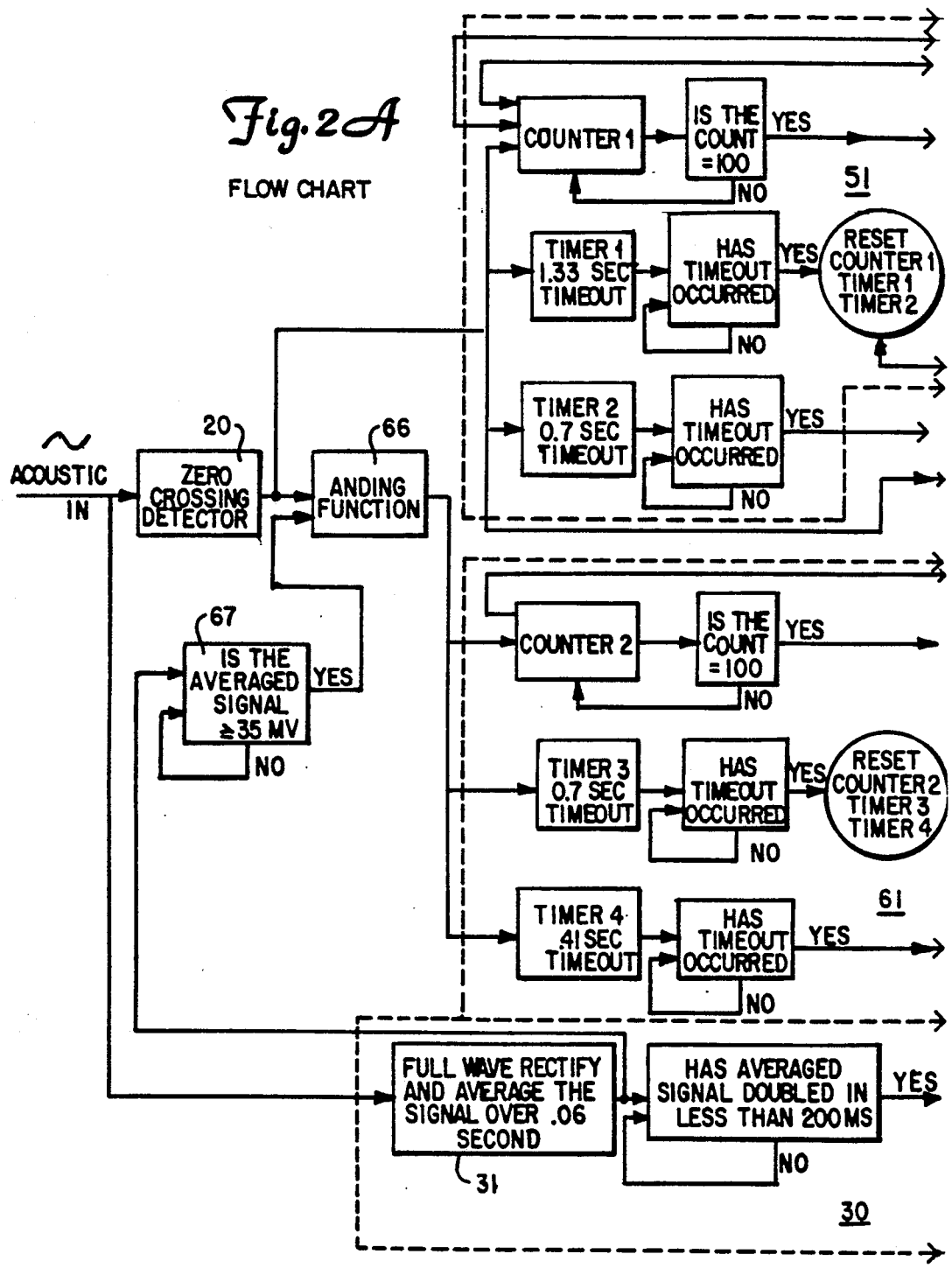

FLOW CHART

ACOUSTIC ALERT SENSOR

FIELD OF THE INVENTION

This invention pertains to acoustic sensors. Particularly, the invention pertains to means for sensing acoustic signals produced by vehicles. More particularly, the invention pertains to devices that filter signals to determine whether the signals fall within a predetermined frequency band, to count zero crossings, and to count a predetermined number of zero crossings in a predetermined time in order to alert a system of the presence of a vehicle.

BACKGROUND OF THE INVENTION

Previously, seismic systems have been used to detect the presence of both heavy and light ground based vehicles. However, seismic detectors have some inherent problems. One of these problems is with wind induced seismic detections. The seismic alert system would give a false signal if the wind would be in the area of 10 to 30 mph. Further, seismic systems are also dependent upon the energy level of the seismic signal and not the frequency of the signal.

An example of a previous seismic device is U.S. Pat. No. 4,415,979, by Hernandez. The patent teaches a seismic sensor which utilizes an analog signal to calculate power. U.S. Pat. No. 4,604,738, by Aggerwal et al. with the same assignee as this invention, classifies a vehicle as to a light or heavy according to the ratio of the Rayleigh seismic signal and the acoustically coupled seismic signal. Thus, this patent requires both the use of a microphone and a geophone. Other seismic signal detectors have been identified and will be included in the disclosure statement accompanying this application.

The second method often used to detect the presence of light and heavy vehicles has been acoustic signal processors. The present acoustic signal processors identified in prior art have been concerned with two things, they are either analog signal processors, or they are concerned with the energy level of the incoming signal. The applicant's invention utilizes an acoustic signal processor, however, the signal processing is digital and is concerned with the frequency of the incoming signal.

SUMMARY OF THE INVENTION

This invention is a means for discriminating an acoustic signal utilizing the consistency of the signal's presence to determine whether it falls within a predetermined frequency band. The system comprises a means for sensing an acoustic signal, this means provides a first signal with a zero reference. This signal is provided to a first counter, a first counter counting each time the first signal crosses the zero reference. Thus, the first counter counts at a frequency equivalent to the primary signal being provided by the acoustic sensor. The counter attempts to count to a predetermined number, for instance 100, in a predetermined time. A pair of timers is utilized to ensure that this time period is observed. A first timer prevents the counter from outputting a second signal to a second counter until predetermined time has elapsed. A second timer resets the first counter if the first counter does not reach the predetermined number, in this case 100, before the second timer reaches a specific time. If the first counter should reach the predetermined number after the first timer has reached its time out, but prior to the second timer reaching its time out, a second signal is transmitted to a second counter. Upon the second signal being transmitted to the second counter, the first counter is again reset. The second counter counts the number of second signals received, the second counter upon receiving a second predetermined number of second signals will alert for instance a mine, that a vehicle is present. However, the second counter must receive the predetermined number of second signals within a predetermined time, or the second counter will also be reset.

BRIEF DESCRIPTION OF THE DRAWINGS

FIG. 1 is a system diagram showing the operation of the system.

FIG. 2A and 2B are flow chart which further clarify the system diagram.

DESCRIPTION OF THE PREFERRED EMBODIMENT

Figure 2B:
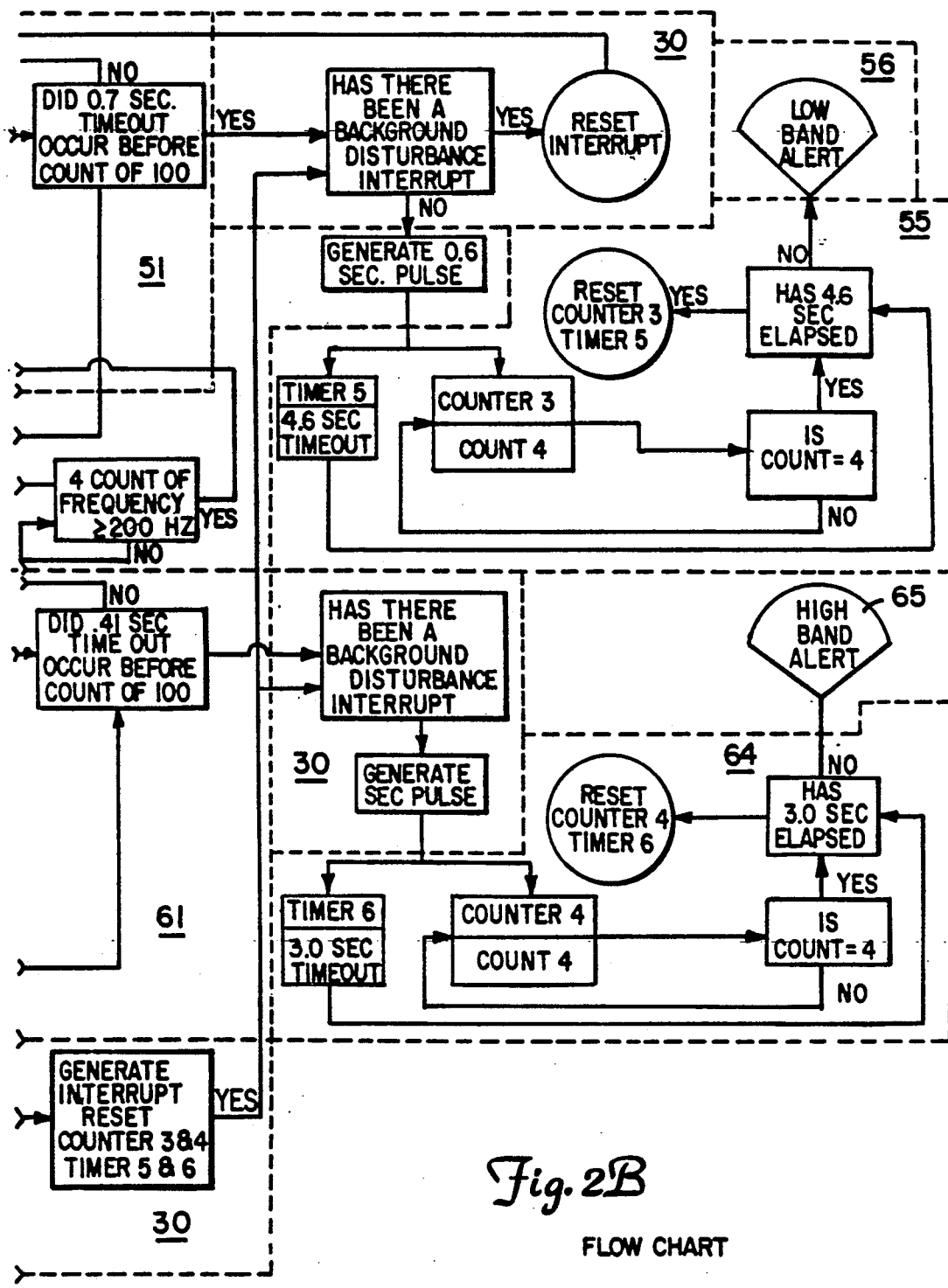

FIG. 1 is a system diagram demonstrating the means for discriminating the incoming acoustic signals for the preferred embodiment. The system diagram is divided up into six separate blocks each of which serves a separate function. The separate blocks are sensor block 10, zero crossing detector 20, rapid increasing signal detector 30, seismic alert 40, low band alert 50, and high band alert 60.

Sensor 10 incorporates a Knowles BL 1994 microphone 11, the output of microphone 11 being input into an acoustic preamp 12 having a 60 hertz highpass filter 12. High pass filter 12 is used solely to eliminate DC offsets. Sensor 8 also incorporates a geophone 15 with a preamplifier 16, preamplifier 16 providing a signal to seismic alert 40. The output of acoustic preamp 12 is input into both zero crossing detector 20 and rapid increasing signal detector 30.

Zero crossing detector 20 is a device which outputs a digital signal pulse each time the output from acoustic preamp 12 for Knowles microphone 11 crosses a zero level. The zero level is generally considered to be ground; however, this level may be changed at the discretion of the designer. The output of zero crossing detector 20 is supplied to lowband alert 50 and high band alert 60. Lowband alert 50 counts the number of zero crossing pulses and attempts to count to 100 within a predetermined time. The first block of lowband alert 50 is made up of a counter and two timers 51. Counter 51 counts the number of zero crossing pulses; upon receiving the first zero crossing pulse, both of the timers begin timing. There is a lower limit timer and a upper limit timer. The upper limit timer blanks the output of counter 51 until a predetermined time has elapsed. In this manner if zero crossing detector 20 detects 100 zero crossings in a time that would require a higher frequency than the upper frequency limit, counter 51 would be prevented from passing on an output. If, however, the frequency of the zero crossings is low enough such that counter 51 will not count to 100 prior to this time, the first timer allows the signal to pass. The second timer is a low frequency timer and operates such that counter 51 is reset after a predetermined time. In this way, it prevents the system from being alerted to signals which are either of too low a frequency or are not consistent enough to have the counter count to 100 within the predetermined time. If the signal should reach a count of 100 within the time frame permitted, the signal is passed onto an "and" function 53.

Concurrent with the first counter a high frequency burst detector 52 is also incorporated. High frequency burst detector 52 looks for a series of zero detections which occur within a short period of time; for instance, four zero detections within the period of 15 milliseconds would determine that the frequency was above the desired frequency level and this would reset first counter 51.

Rapid increasing signal detector 30 is utilized to determine whether or not there is a signal that should be rejected due to the wind or some other disturbance (e.g., gunfire or explosives). The output from acoustic preamp 12 is directly fed into a full wave rectifier 31. The rectified signal is averaged by short-term averager 32. The averaged signal is averaged again by a long term averager 33. The second average is then offset by a DC level. Both of these inputs are provided to a threshold detector and if the first average should increase at a rate dramatically higher than the second average then a wind alert is provided through "and" function block 53.

If first counter 51 should reach 100 within the predetermined time, without high frequency burst detector 52 resetting counter 51, and no signal is present from rapid increasing signal detector 30, "and" function 53 passes the second signal to pulse shaper 54. Pulse shaper 54 is in essence a one shot which provides a signal to a second counter 55. Second counter 55 counts the number of signals from one shot 54 and if four signals should come within a preselected period of time, a low band alert 56 is signaled. The predetermined time is selected such that the signal from first counter 51 must be consistent in order to set off an alert.

Short-term averager 32 of the rapid increasing signal detector 30 outputs a second signal to a positive voltage comparator 67. Positive voltage comparator 67 is in essence a threshold detector to determine whether or not the output of the short-term averager is of a sufficient level. If this signal is of a sufficient level, "anding" function block 66 allows zero crossing detector 20 signal to pass to highband alert 60. Highband alert 60 operates in a similar manner as lowband alert 50, the only difference being that the times are shorter in duration. The outputs of both lowband alert 50 and highband alert 60 are put through an "oring" function 70 in combination with seismic alert 40 and are supplied to a "anding" function 75. If either a lowband alert 50 or a highband alert 60 combined with a seismic alert 40 is present, the device will provide an alert signal.

FIGS. 2A and B are flow chart which demonstrates the functions of FIG. 1. FIGS. 2A and B show the logic steps the acoustic alert takes in processing the acoustic signal for both the high band alert and the low band alert.

Figure 3:
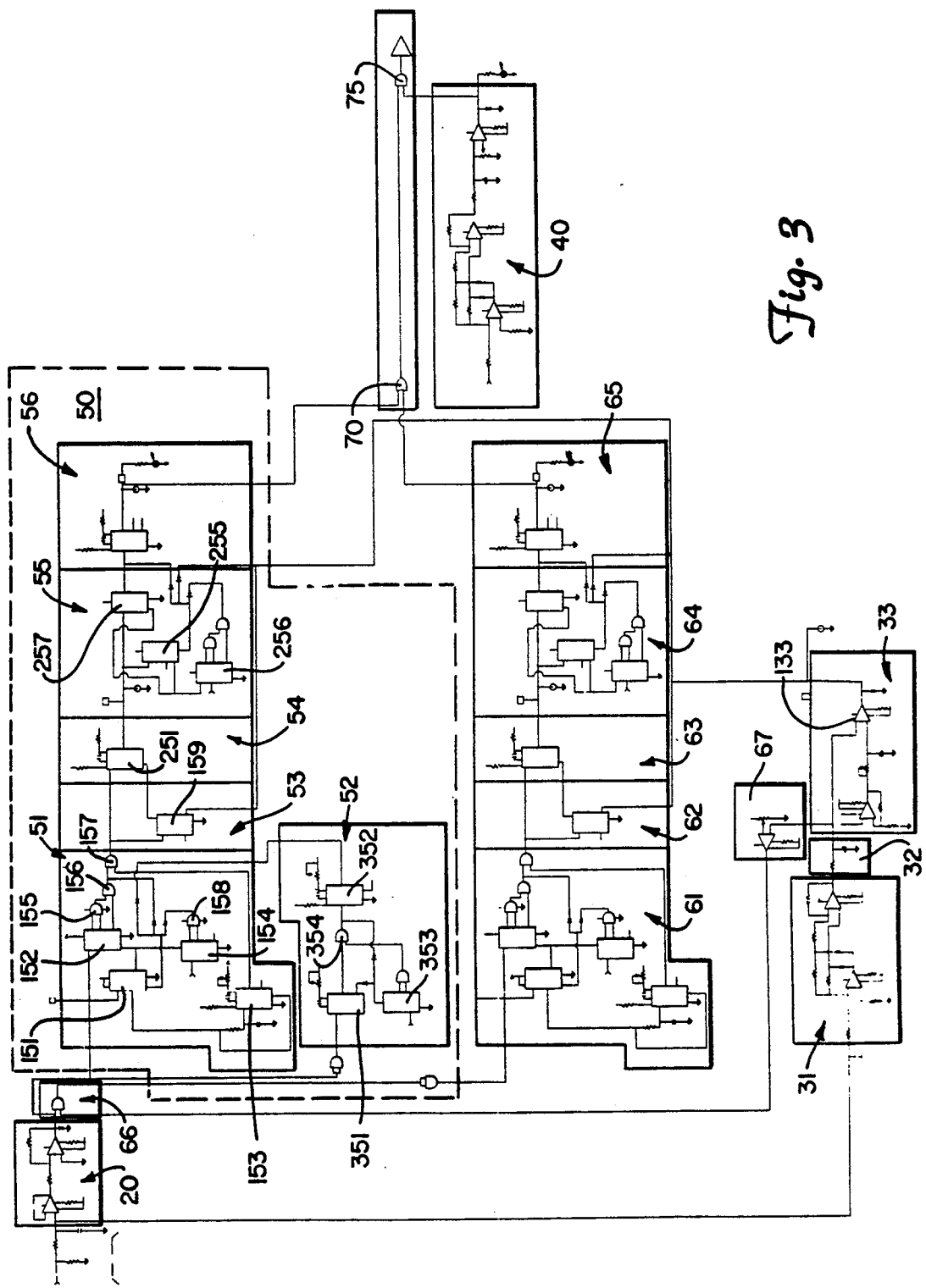
FIG. 3 is a schematic diagram of the system.

FIG. 3 is a schematic diagram of the preferred embodiment, the system is broken up into eighteen separate function blocks wherein function blocks 51, 52, 53, 54, 55, and 56 comprise lowband alert 50. Block 20 comprises the zero crossing detector, block 66 comprises the "anding" function, and block 67 comprises the positive voltage comparator. Blocks 61, 62, 63, 64 and 65 comprise the remainder of highband alert 60, block 40 comprises the seismic alert, block 75 comprises final "anding" function and block 70 comprises the "oring" function.

The primary filtering unit for this device is lowband alert 50. Block 51 of lowband alert 50 comprises a 4013B dual D flip-flop 151, two 4040B 12 stage ripple carry binary counter/dividers 152 and 154 provided by National, a 4528B dual monostable multi-vibrator 153 provided by National, a 4081B quad 2 input "and" gates 155, 156, 157, and 158 provided by National and a plurality of diodes, resistors and capacitors as needed.

Figure 4:
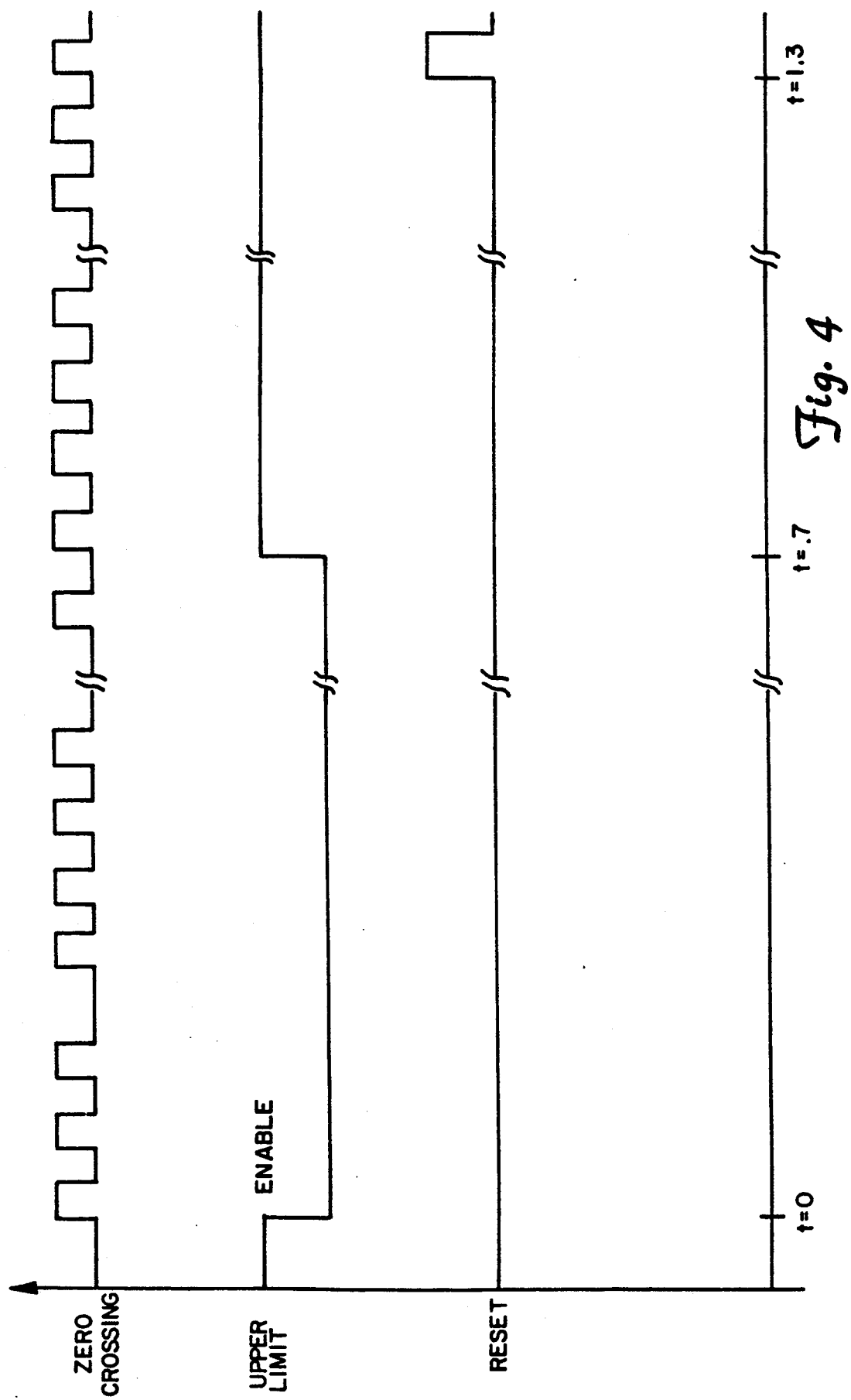
FIG. 4 is a timing diagram of the low band alert counter.

FIG. 4 demonstrates the timing diagram of block 51. Zero crossing detector 20 provides a series of pulses representative of the frequency of the acoustic signal sensed by acoustic sensors 11 (not shown in FIG. 4). This signal is input to counter 152 which is a 4040B 12 stage ripplecarry binary counter/divider. The signal is also input into a 4013 dual D flip-flop 151 provided by National. Dual D flip-flop 151 resets counter 152 and both timing circuits 153 and 154. Counter 152 begins counting the pulses from zero crossing detector 20 and attempts to count to 100. Upper limit counter 153 is a 4528B dual monostable multi-vibrator which upon receiving the signal from 4013 D flip-flop 151, provides a logic "0" to a first "and" gate 157. The logic "0" to first "and" gate 157 prevents counter 152 from outputting a signal to blocks 53 and 54. If the time period, in this case 0.7 seconds, has elapsed, the timer then gives an enable signal or logic "1" to "and" gate 157 which allows a signal from counter 152 to pass. Second timer 154 is a low limit cutoff, and a 4040 counter. Second timer 154 is provided with a clock signal; the clock signal is at 1.5 kilohertz. Second timer 154 provides a reset: to D flip-flop 151 if a period of time, in this case, 1.3 seconds has passed before counter 152 has counted to 100. Counter 152 upon reaching 100, provides a signal to blocks 53 and 54 and further resets D flip-flop 151. D flip-flop 151 may also be reset by high frequency burst detector block 52. Burst detector 52 is described below. A wind interrupt is connected to a 4013 dual D flip-flop 159 in block 53 which prevents one shot 251 in block 54 from providing an output block 54 is a one shot 251, one shot 251 being a 4528B which provides a pulse which is 0.6 seconds in duration. This pulse is provided to a second counter 55 which comprises a 4040 binary counter 255. Counter 55 has a timer 256 comprised of a 4040 counter. Timer 256 is set for 4.6 seconds and if second counter 55 does not receive four pulses from one shot 251 in block 54 in this 4.6 second period, second counter 255 will be reset along with first counter 152. If the signal is present, second counter 255 will provide a signal to a 4013 D flip-flop 257 which will provide a signal to the final pulse shaper which is block 56. D flip-flop 257 also resets counter 255 when a count of 4 is reached. Final pulse shaper 56 is again a one shot which provides a 3.5 second pulse. This pulse is provided to an "or" gate 70.

High frequency burst detector 52 is made up of a pair of one shots 351 and 352 and a 4040 counter 353. The zero crossing signal is provided to first one shot 351. Upon sensing a zero crossing, first one shot 351 provides a pulse with a duration of 5 milliseconds. The falling edge of the 5 milliseconds resets a counter 353. Counter 353 is set to count to 15 milliseconds. The counter 353 is a 4040 counter as described above. If one shot 351 receives a second zero crossing in less than 5 milliseconds, it will remain high until that 5 millisecond period has passed; thus, counter 353 will not be reset at the end of the first 5 millisecond pulse. If one shot 351 should detect a third zero crossing prior to the conclusion of the second 5 millisecond pulse, counter 353 will again not be reset which will allow it to reach its 15 millisecond time upon which it will provide a signal to an "and" gate 354. The output from one shot 351 is also provided to this "and" gate 354. If both signals should provide a logic "1", the logic "1" is provided to a second one shot 352. The logic "1" also resets the 15 millisecond counter 353. When a logic "1" signal is sensed by second one shot 354, second one shot 354 resets initial counter 51.

Highband alert 60 blocks 61, 62, 63, 64 and 65 are similar to those of lowband alert 50, the only difference being that the timers are set to prevent a pass signal in less than 0.4 seconds and to reset the highband counter at 0.7 seconds.

Another feature of the device is rapid increasing signal detector 30 or wind interrupt. The analog signal directly from acoustic preamplifier 12, described in the block diagram of FIG. 1, is provided to a full wave rectifier shown in block 31. Full wave rectifier 31 provides a rectified signal to a short-term averager 32. The output of short-term averager 32 is provided to a positive voltage comparator 67 and to a long-term averaging circuit 33. The long-term averaging circuit offsets the short-term averaging signal 32 and averages the signal a second time. These two signals are then compared at a threshold amplifier 133 and if the short-term average should increase at a rate dramatically faster than the long-term average, wind interrupt signal is provided to both highband alert 60 and the lowband alert 50, which resets both systems.

The highband alert signal and the lowband alert signal are provided to an "or" gate 70 and if either should be present it is provided to a second "and" gate 75. To prevent further false alarms, a seismic detector 40 is also utilized. Seismic detector 40 is a simple seismic detector; this is to prevent the occurrence of low flying aircraft from triggering the system.

Figure 5:
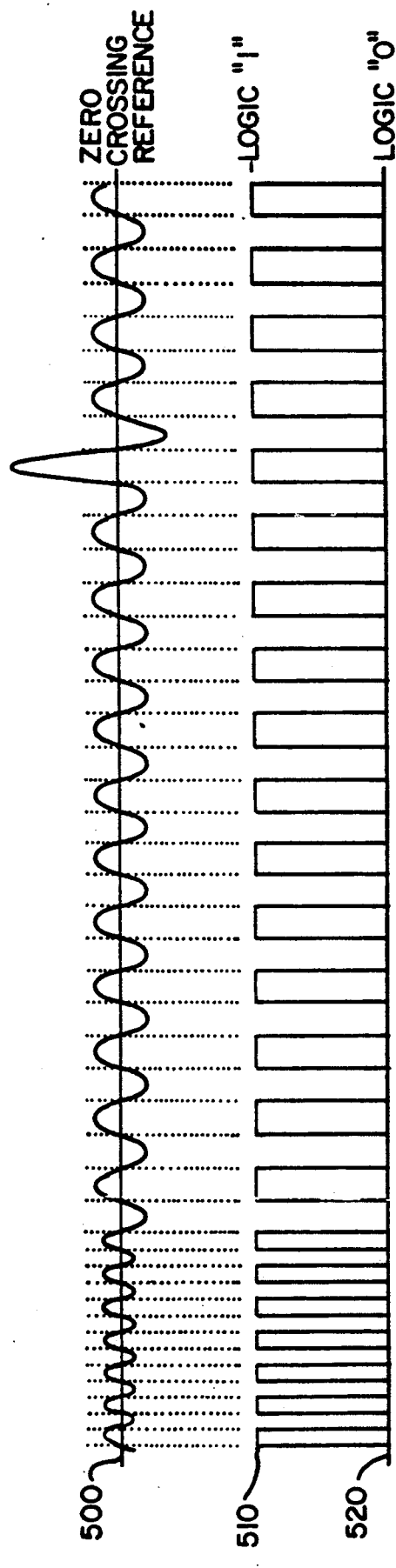
FIG. 5 is a timing diagram that demonstrates the method of zero crossing detection.

FIG. 5 demonstrates how an acoustic signal input into zero crossing detector 20 is output into a digital representation of the frequency. Each time the incoming signal crosses the zero crossing reference 500 the output of zero crossing detector 20 switches from a logic "0" to a logic "1", or if it is currently a logic "1" will switch from a logic "1" to a logic "0". In this manner each and every time the primary signal from the acoustic sensor crosses the zero crossing reference and returns across the zero crossing reference a pulse is provided by zero crossing detector 20. In this manner two important objectives are achieved. The first is that an accurate digital signal is provided by zero crossing detector 20 which accurately imitates the frequency of the primary signal sensed by acoustic sensor 11. The second function is that high frequency noise is eliminated due to the fact that the device only switches from a logic "1" to a logic "0" or from a logic "0" to a logic "1" when the signal crosses the zero crossing reference; thus, a higher frequency may ride on the primary signal without affecting the output.

I claim:

1. An acoustic alert detector for detecting an acoustic signal produced by a vehicle, said detector comprising:
   sensing means for sensing acoustic signals providing a first signal having a zero reference;
   first counting means for counting a first predetermined number of crossings by said first signal of said zero reference, and for providing a second signal upon said first predetermined number of said crossings by said first signal of said zero reference being counted;
   second counting means for counting a second predetermined number of said second signals, and for providing a third signal upon said second predetermined number of said second signals being counted;
   first timing means for permitting said second signal to pass to said second counting means after a first predetermined time;
   second timing means for resetting said first counting means after a second predetermined time, said second predetermined time being greater than said first predetermined time; and
   third timing means for resetting said second counting means after a third predetermined time.

2. The acoustic alert detector of claim 1 further comprising a rapid increasing signal detector, wherein said sensing means provides said first signal to said rapid increasing signal detector, and said rapid increasing signal detector comprises:
   full wave rectifying means for rectifying said first signal and providing a fourth signal;
   short-term averaging means for averaging said fourth signal and providing the average of said fourth signal as a fifth signal;
   long-term averaging means for averaging said fifth signal into a sixth signal; and
   threshold means for comparing said fifth and said sixth signals and permitting said second signal to pass.

3. The acoustic alert detector of claim 1 further comprising a high frequency burst detector for counting said zero crossings and resetting said first counter if said high frequency burst detector detects a predetermined number of said zero crossings in a fourth predetermined time.

4. The acoustic alert detector of claim 3 further comprising detector means for detecting a seismic signal, said acoustic alert detector providing a fourth signal if said third signal and said seismic signal are present.

5. The acoustic alert detector of claim 3 further comprising:
   a threshold detector for detecting the magnitude of said first signal;
   third counting means, said threshold detector providing said first signal to said third counting means if said magnitude of said first signal is above a predetermined magnitude, said third counting means for counting a third predetermined number of said first signals crossings of said zero reference and for providing a fourth signal when said third predetermined number is reached;
   fourth counting means for counting a fourth predetermined number of said fourth signals and for providing a fifth signal upon said fourth predetermined number of said fourth signals being counted;
   fourth timing means permitting said fourth signal to pass to said fourth counting means after a fifth predetermined time;
   fifth timing means resetting said third counting means after a sixth predetermined time, said sixth predetermined time being greater than said fifth predetermined time; and
   sixth timing means resetting said fourth counter after a seventh predetermined time.

6. An acoustic alert detector for detecting an acoustic signal produced by a vehicle, said detector comprising:

an acoustic sensor for sensing acoustic signals providing a first signal with a zero reference;
a zero crossing detector for producing a first pulse when said first signal crosses said zero reference;
a first counter for counting said first pulses, said first counter providing a second pulse when said first counter counts first predetermined number of said first pulses;
a second counter for counting said second pulses, said second counter providing a third pulse when said second counter counts a second predetermined number of said second pulses;
a first timer permitting said second pulse to pass to said second counter after a first predetermined time;
a second timer for resetting said first counter after a second predetermined time, said second predetermined time being greater than said first predetermined time; and
a third timer for resetting said second counter after a third predetermined time.

7. The acoustic alert detector of claim 6 further comprising a rapid increasing signal detector, wherein said sensing means provides said first signal to said rapid increasing signal detector, and said rapid increasing signal detector comprises:
a full wave rectifier for rectifying said first signal and providing a fourth signal;
short-term averaging means for averaging said fourth signal and providing the average of said fourth signal as a fifth signal;
long-term averaging means for averaging said fifth signal into a sixth signal; and
threshold means for comparing said fifth and said sixth signals and permitting said second signal to pass.

8. The acoustic alert detector of claim 6 further comprising a high frequency burst detector for counting said zero crossings and resetting said first counter if said high frequency burst detector detects a predetermined number of said zero crossings in a fourth predetermined time.

9. An acoustic alert detector for detecting an acoustic signal produced by a vehicle, said detector comprising:
sensing means for sensing acoustic signals providing a first signal having a zero reference;
first counting means for counting a first predetermined number of crossings by said first signal of said zero reference, and for providing a second signal upon said crossings by said first predetermined number of said first signal of said zero reference being counted; and
second counting means for counting a second predetermined number of said second signals, and for providing a third signal upon said second predetermined number of said second signals being counted, said third signal being an alert signal.

10. The acoustic alert detector of claim 9 further comprising:
first timing means for permitting said second signal to pass to said second counting means after a first predetermined time;
second timing means for resetting said first counting means after a second predetermined time, said second predetermined time being greater than said first predetermined time; and
third timing means for resetting said second counting means after a third predetermined time.

11. The acoustic alert detector of claim 10 wherein said sensing means comprises a microphone, said microphone sensing said acoustic signal and providing said first signal.

* * * * *